(12) United States Patent
Ku

(10) Patent No.: US 6,942,338 B2
(45) Date of Patent: Sep. 13, 2005

(54) SPECTACLE FRAME HAVING USER-REPLACEABLE ARM

(75) Inventor: Otis Ku, Kowloon (CN)

(73) Assignee: Sun Hing Optical Manufactory Limited, Hong Kong (CN)

( * ) Notice: Subject to any disclaimer, the term of this patent is extended or adjusted under 35 U.S.C. 154(b) by 157 days.

(21) Appl. No.: 10/700,037

(22) Filed: Nov. 3, 2003

(65) Prior Publication Data

US 2005/0094093 A1 May 5, 2005

(51) Int. Cl.⁷ .................................................. G02C 5/22
(52) U.S. Cl. ........................................ 351/153; 16/228
(58) Field of Search ................................. 351/153, 116, 351/111, 90, 140; 16/228

(56) References Cited

U.S. PATENT DOCUMENTS 3,762,804 A * 10/1973 Livas .......................... 351/90

* cited by examiner

Primary Examiner—Hung Xuan Dang
(74) Attorney, Agent, or Firm—Alix, Yale & Ristas, LLP

(57) ABSTRACT

A spectacle frame has a frameless lens or lens frame, an arm, a clamp that bears upon the arm and is attached hingedly to an arm mounting of the frameless lens or lens frame. The clamp enables easy removal and replacement of the arm without the need for tools.

5 Claims, 2 Drawing Sheets

SPECTACLE FRAME HAVING USER-REPLACEABLE ARM

BACKGROUND OF THE INVENTION

In the war for a method for The present invention relates to spectacle frames. More particularly, although not exclusively, the invention relates to a spectacle frame having easily removable arms that can be replaced with other arms—perhaps after damage of an arm, or for the purpose of changing the appearance of spectacles.

It is known to connect the arms of spectacle frames to the lens frame or lens edge with a hinge. The hinges comprise a small screw that requires the use of a small screwdriver (usually by an optometrist) for the purpose of removal and refitting.

OBJECT OF THE INVENTION

It is an object of the present invention to provide a spectacle frame having arms that can be removed without the need for a tool.

DISCLOSURE OF THE INVENTION

There is disclosed herein a spectacle frame comprising:

a frameless lens or lens frame, an arm, a clamp bearing upon the arm and temporarily securing the arm to the frameless lens or lens frame and attached hingedly to an arm mounting of the framelens lens or lens frame.

Preferably the clamp comprises a hinge plate at one side of the arm that is connected by a pivot pin to the arm mounting of the frameless lens or lens frame, and a clip at the other side of the arm co-operating with the hinge plate.

Preferably the arm has a transverse aperture therethrough and the clip has a tab that extends into the aperture.

Preferably the arm has an end recess adjacent to the aperture and the clip has a spacer that extends into the recess.

Preferably the hinge plate has a stopper that extends into the recess of the arm alongside the spacer.

Preferably the clip has an extension that bears against the arm mounting to define a pivot list of the arm.

BRIEF DESCRIPTION OF THE DRAWINGS

A preferred form of the present invention will now be described by way of example with reference to the accompanying drawings, wherein.

DESCRIPTION OF THE PREFERRED EMBODIMENT

Figure 1:
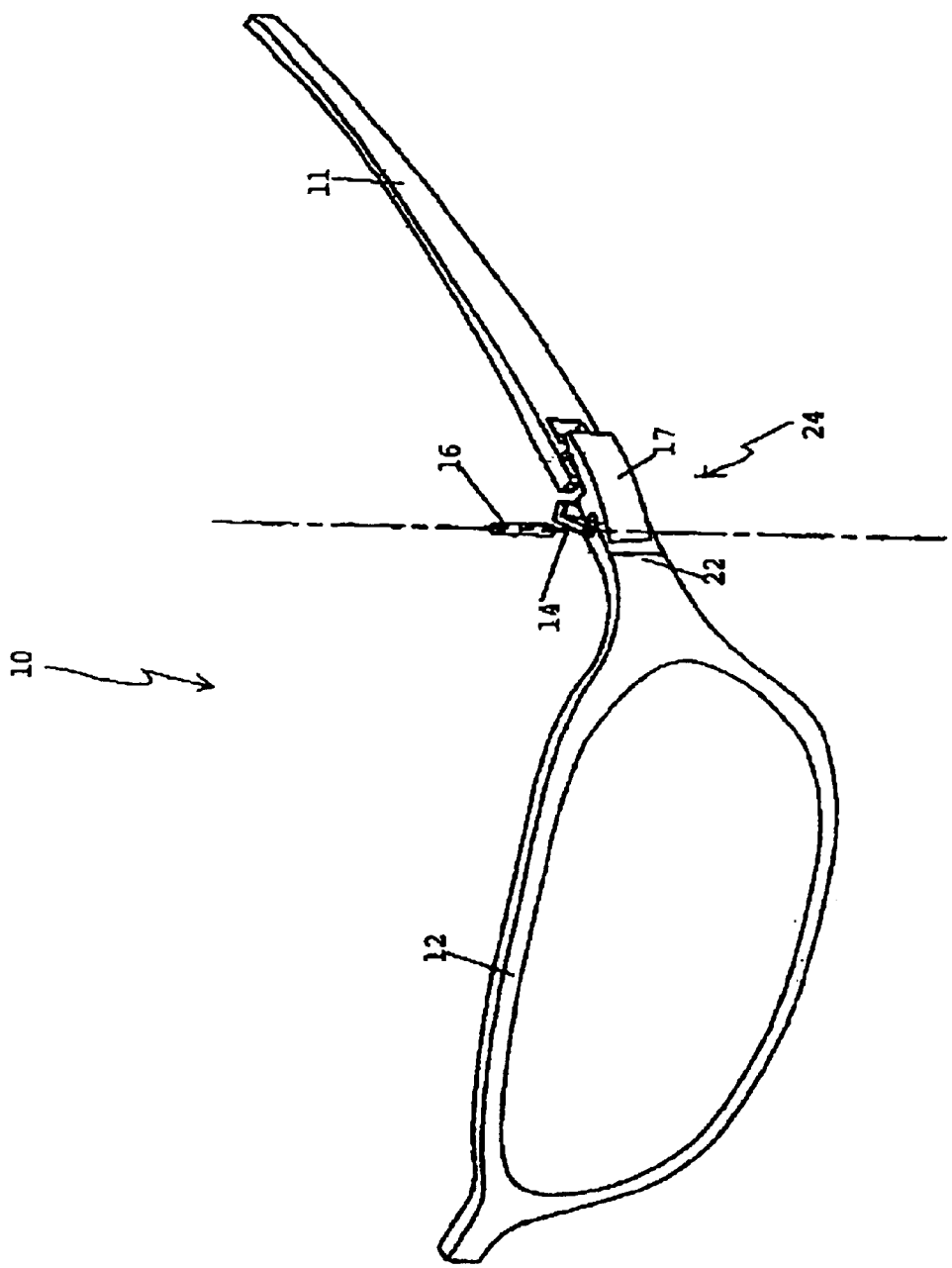
FIG. 1 is a schematic perspective illustration of a lens frame having an arm attached thereto by a clamp.
Figure 2:
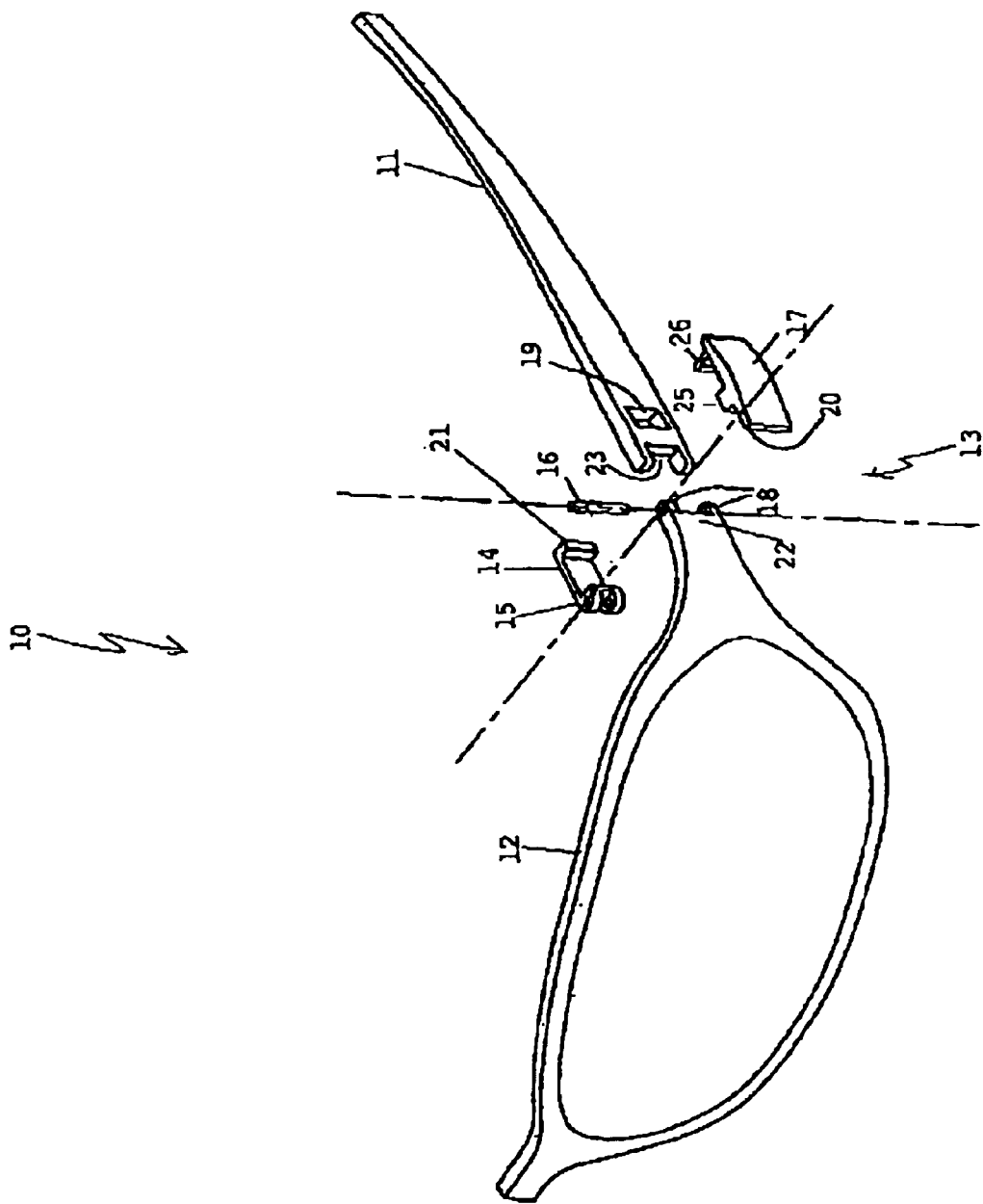
FIG. 2 is a schematic parts-exploded perspective view of the lens frame. arm and clamp of FIG. 1.

In the accompanying drawings there is depicted schematically a spectacle frame 10. The frame 10 comprises a lens frame 12 and an arm 11 attached to an arm mounting 22 of the lens frame 12 by a clamp 24.

Clamp 24 comprises a hinge plate 14 having a pair of eyelets 15 through which a pin 16 extends to hingedly attach the hinge plate 14 to corresponding eyelets 18 extending from the arm mounting 22 of the lens frame 12. The hinge plate 14 has a stopper 21 projecting therefrom.

The arm 11 has a transverse aperture 19 near its proximal end at which there is a recess 23.

There is a clip 17 having a tab 26 that extends into the aperture 19 of the arm 11. The clip 17 also has a spacer 25 extending inwardly therefrom. The stopper 21 of the hinge plate 14 extends into the recess 19 of the arm 11. The spacer 25 fits into a recess 23 at the end of the arm 11. The clip 17 also includes an extension 20 that bears against the arm mounting 22 of the lens frame 12 to define a pivotal limit of the arm 11. The spacer 25 and stopper 21 together fill the gap between the arm mounting 22 and arm 11. This provides a rigid hinge connection, whereas the tab 26 is retained resiliently within the aperture 19 to maintain contact force therewith and thereby maintain rigidity between the clamp and the arm.

The lens frame 12 and arm 11 can be formed of plastics or metal and the hinge plate 14 and clip 17 might similarly be formed of plastics or metal. The pin 16 would typically be made of metal.

The hinge plate 14, pin 16 and clip 17 would generally be a permanent fixture to the arm mounting 22, whereas the arm 11 would be a replaceable item.

The user might have a number of differently fashioned arms and clips to attach as desired or alternatively, a broken arm 11 can readily be replaced by the user upon purchase of a replacement part without the use of tools.

It should be appreciated that modifications and alterations obvious to those skilled in the art are not to be considered as beyond the scope of the present invention. For example, departure can be made from the precise configuration of the clamp is depicted in the drawings.

What is claimed is:

1. A spectacle frame comprising:

a lens frame;

an arm;

a clamp having a hinge plate, said clamp bearing upon the arm and temporarily securing the arm to the lens frame, said clamp attached hingedly to an arm mounting of the lens frame, wherein the clamp comprises a hinge plate at one side of the arm that is connected by a pivot pin to the arm mounting of the lens frame; and a clip at the other side of the arm co-operating with the hinge plate.

2. The spectacle frame of claim 1 wherein the clip has an extension that bears against the arm mounting to define a pivot limit of the arm.

3. A spectacle frame comprising:

a lens frame;

an arm;

a clamp bearing upon the arm and temporarily securing the arm to the lens frame, said clamp attached hingedly to an arm mounting of the lens frame, wherein the arm has a transverse aperture therethrough; and a clip having a tab that extends into the aperture of the arm.

4. The spectacle frame of claim 3 wherein the arm has an end recess adjacent to the aperture and the clip has a spacer that extends into the recess.

5. The spectacle frame of claim 4 wherein the hinge plate has a stopper that extends into the recess of the arm alongside the spacer.

* * * * *